April 23, 1940.  E. H. CHANDONIA  2,198,106
PAN SET GUIDE MEANS
Filed Aug. 3, 1938
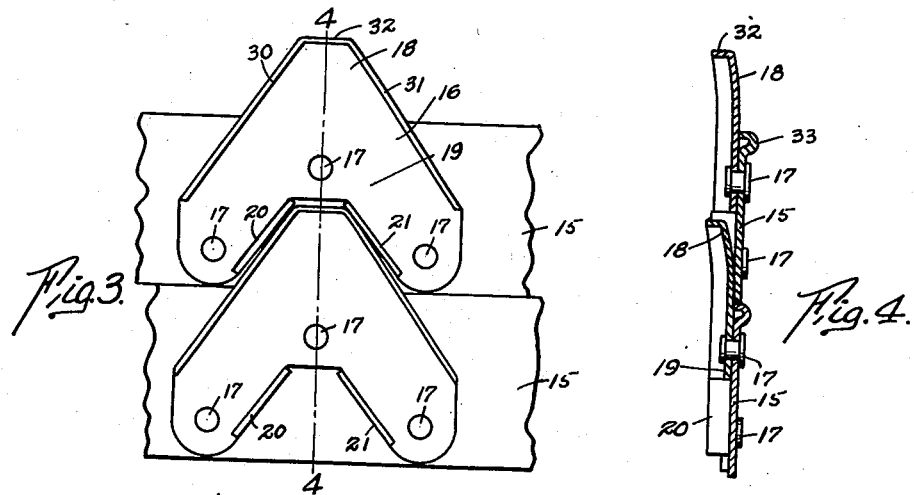
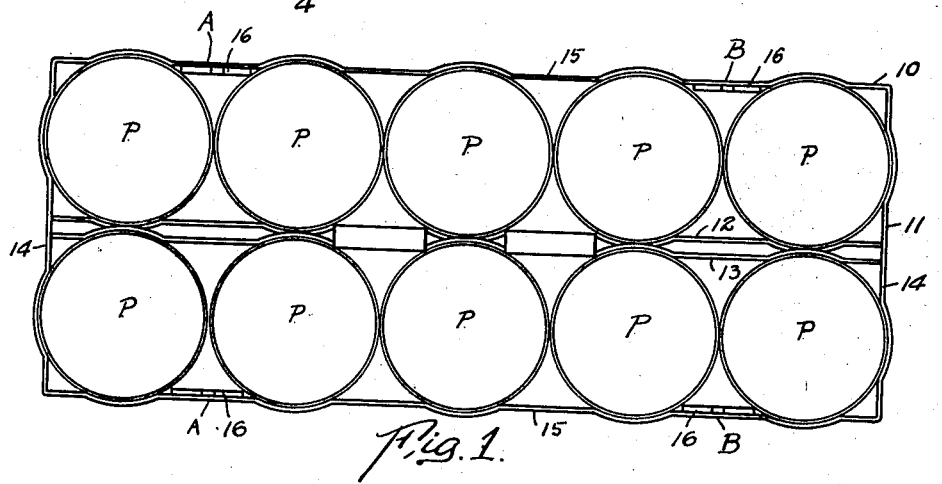
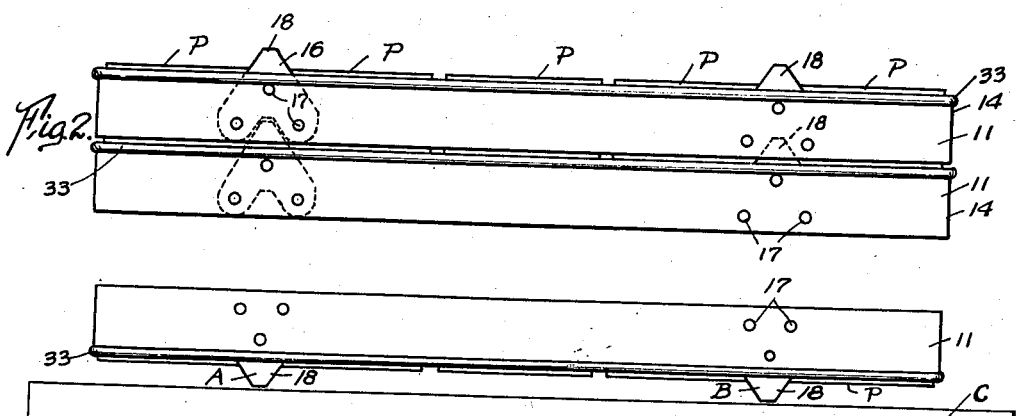
INVENTOR
Elmer H. Chandonia
BY Frank Zugelter
ATTORNEY Patented Apr. 23, 1940

2,198,106

UNITED STATES PATENT OFFICE 2,198,106

PAN SET GUIDE MEANS

Elmer H. Chandonia, Amelia, Ohio, assignor to The Lockwood Manufacturing Company, Cincinnati, Ohio, a corporation of Ohio Application August 3, 1938, Serial No. 222,871

11 Claims. (Cl. 53—6)

This invention relates to guide means and more particularly to guide means for use with multiple unit bake pan sets for facilitating stacking or nesting of such pan sets one upon another.

An object of the invention is to provide nesting means for multiple unit bake pan sets which are durable and inexpensive to manufacture.

A further object of the invention is to provide in a multiple unit bake pan set means for facilitating turning out or removing of baked goods from the pans without damage to such baked goods.

Still a further object of the invention is to provide in a multiple unit bake pan set, guide and nesting means which extend bodily upward of the pan units.

These and other objects are attained by the means described herein, and disclosed in the accompanying drawing, in which:

Fig. 1 is a top plan view of a multiple unit bake pan set embodying the invention.

Fig. 2 is a side plan view showing two multiple unit bake pan sets embodying the invention, nested one upon the other.

Fig. 3 is an enlarged front plan view of a detail of the invention.

Fig. 4 is a cross-sectional view taken on line 4—4 of Fig. 3.

Fig. 5 is a side plan view of a bake pan set embodying the invention inverted upon a table top.

As shown in Fig. 1, a multiple unit bake pan set 10 comprises a plurality of individual bake pans P which are secured together in rows to form an integral unit or set by means of a circumscribing strap 11. If desired the pans may be further secured together by means of straps 12 and 13 which extend longitudinally of the unit between the rows of pans. Each pan may be secured to abutting portions of the straps by any suitable means such as rivets, not shown. Such multiple unit bake pan sets are usually rectangular in shape, the number of individual pans P comprising a set being arbitrarily determined in each instance by the manufacturer.

Circumscribing strap 11 includes spaced parallel ends 14 and spaced parallel sides 15, Fig. 1. If desired a reinforcing rib as 33 may be provided along the upper perimeter of strap 11. Suitable guide members 16 are secured at spaced intervals to the inner side of side walls 15 by any suitable means such as rivets 17.

As clearly shown in Figs. 3 and 4, each guide member 16 comprises an upwardly extending tongue portion 18 and a lower or base portion 19. Each guide member 16 may be secured to the circumscribing strap 11 by rivets 17 whereby the tongue portion 18 will project above the upper edge of said circumscribing strap. Tongue 18 may assume any self aligning shape such as that of a truncated triangle as shown. As shown in Fig. 4, tongue 18 may be inclined inwardly of the plane of the circumscribing strap to extend inwardly of the body of the pan set to facilitate nesting.

The base portion of each guide member is provided with a tongue receiving pocket, said pocket being defined by a pair of upwardly converging legs 20 and 21 which are disposed below and in substantial parallelism with corresponding portions 30 and 31 of the convergent sides of said tongue member 18, the upper ends of said convergent sides 30 and 31 may, if desired, be connected as at 32.

Each guide member is secured to the inner side of the circumscribing strap (Figs. 2, 3, and 4) with the tongue 18 projecting above said strap and inclined inward of said pan set. This facilitates ease of stacking a plurality of pans since the inclination of tongue 18 permits the top of said tongue to more easily be aligned between the opposite walls of the circumscribing strap of a pan set being nested upon it. As the upper pan set comes to rest upon the lower pan set, the lower portion of the outer face of the tongue 18 will be wedged against the inner side of the circumscribing strap of the upper set and in alignment between the converging legs of the pocket of the guide member of said upper pan set whereby the two pans will be disposed in vertical alignment and be secured against relative lateral or transverse movement.

Guide members 16 may be stamped from any flat sheet of metal, and in order to strengthen the surfaces subjected to greatest wear and in order to provide a sufficient bearing area of the tongue and converging legs, the edges of these members may be formed at right angles with the plane of the body of the guide member, as clearly shown in Figs. 3 and 4.

By reason of the fact that the guide members 16 are disposed on side walls 15 intermediate the ends 14, there is little likelihood of their being damaged as the pans are handled during certain of the stacking and cleaning up operations.

A second very advantageous result is accomplished by reason of providing the guide members along the sides of the pan sets. Heretofore after the contents of such a multiple pan set had been baked, the process of removing the baked contents from each individual pan without breaking the same presented a problem. The contents of multiple unit bake pan sets were turned out by inverting the set and then inclining said set on one edge while the contents of each individual pan were loosened. Quite often the baked products would fall onto the work table and unless they would land flat they would be broken and rendered unfit for sale.

Applicant has solved this problem by utilizing projecting tongues 18 as legs by means of which an entire pan set structure (Fig. 5) may be inverted and at the same time spaced from a table top C as shown. The baked contents of the individual pans may be easily turned out whole by rocking the entire pan structure endwise about projecting tongue members 18. This may be easily accomplished since tongue members 18 space the pan structure a sufficient distance above the table top C to accommodate the fingers of an operator. The endwise rocking may be accomplished by alternately and rapidly raising and dropping each end of the structure onto tongues 18 as at A or B. In this manner the baked products in the individual pans P, comprising the pan structure, are jarred loose and are free to fall onto table top C in a flat horizontal position. Since the ends of the pan structure need be raised but a few inches from the table top during the jarring operation in order to effectively loosen the baked goods, the danger of spoiling the baked goods from cracking as they fall from their pans is entirely eliminated. The pan structure may be bodily grasped and lifted from the baked goods thus turned out onto the table top by reason of being spaced from said table by tongue member 18.

It should be noted that there is a complete absence of corner nesting means in the pans disclosed. This obviates the objection of corner guide means which are, because of their location, continuously being bumped and rendered useless or partially so as to require the patience and time of an operator while they are being reconditioned. By providing the nesting means along the side walls of the multiple pan unit this disadvantage is effectually overcome.

Such guide members as herein disclosed may, after having served their period of usefulness be easily replaced at the bakery by removing the worn guide members and replacing them with new ones, whereby the period of usefulness of the pan set is not shortened by reason of damage to or wear of the nesting means.

In addition I have provided simple yet effective means for enabling an operator to grasp a multiple unit bake pan set even though inverted.

It is to be understood that various modifications and changes in the structural details of the device may be made, within the scope of the appended claims, without departing from the spirit of the invention.

What is claimed is:

1. In a bake pan structure, the combination of a plurality of pans, a circumscribing strap including spaced parallel sides securing said pans together to form a unitary structure, of spaced guide members secured to opposite sides of said circumscribing strap, each guide member comprising a tongue portion which projects above the said circumscribing strap and the plane of the tops of the pans comprising said structure, and a base portion, said base portion comprising a pair of upwardly converging legs for providing a pocket, the area of said pocket being a complement of the area of said tongue member and aligned vertically below it, each tongue and pocket member adapted to be received within or receive a pocket or tongue member carried by another similar bake pan structure whereby a plurality of such multiple pan structures may be nested one upon another.

2. In a bake pan structure, the combination of a plurality of individual pans, a circumscribing strap including spaced parallel sides for securing said individual pans together to form a unitary structure, of spaced guide members anchored to one pair of opposite sides of said circumscribing strap, each guide member comprising a tongue and an aligned pocket portion, said tongue portion having upwardly converging walls which extend above said circumscribing strap, said base portion having a pocket disposed directly below said tongue member, said pocket being defined by a pair of upwardly converging legs disposed vertically below and in substantial parallelism with corresponding portions of the convergent walls of said tongue member, the guide members of each bake pan structure being adapted to cooperate with similar guide members of other bake pan structures whereby a plurality of such structures may be vertically nested one upon the other.

3. The combination with a multiple unit bake pan set comprising a plurality of individual bake pans and a pair of spaced parallel pan connecting straps forming opposite sides of the pan set, of spaced guide members secured to each strap intermediate the ends thereof, said guide members each comprising aligned complementary tongue and pocket portions, said tongue portions extending upwardly of said straps and adapted to support an inverted bake pan structure above and parallel to a plane work surface so as to provide a space wide enough under the inverted pan structure to accommodate the fingers of an operator.

4. The combination with a multiple unit bake pan set comprising a plurality of individual bake pans and a pair of spaced parallel connecting straps forming opposite sides of the pan set, of guide members secured in spaced relationship to each strap and disposed at a distance from the opposite ends of the straps, said guide members each comprising aligned complementary tongue and pocket portions, said tongue portions extending upwardly above said straps a substantial distance whereby to engage an aligned pocket member of a second multiple unit bake pan set nested upon it, said tongue portions adapted to support said multiple unit set in spaced relationship above a work table when said multiple unit bake pan set is inverted, whereby said bake pan set may be rocked endwise upon said spaced tongue members for facilitating the removal of baked goods from the individual pans.

5. The combination with a multiple unit bake pan set comprising a plurality of individual bake pans secured together in rectangular formation, a pair of spaced parallel connecting straps forming opposite sides of said pan set, of aligned guide members secured in spaced relationship to the inner edge of said straps intermediate the opposite ends thereof, said guide members comprising a single thickness of sheet metal formed to provide an integral tongue and base portion, the bearing surfaces of said tongue and pocket members being reinforced by turning the edges of said members at right angles to the plane of the body of the guide members, said tongue comprising an upwardly extending truncated triangle the upper tip of said tongue being inclined inward of the bake pan structure, said base portion having a pocket disposed below said tongue and in vertical alignment therewith, said pocket being defined by a pair of upwardly converging legs each in substantial parallelism with a corresponding portion of the sides of the triangle comprising the tongue member, the guide members of each bake pan structure being adapted to nest with the complementary portion of other guide members of similar bake pan structurees, the upwardly extending tongue portions of each pan structure being adapted to support an inverted bake pan structure above and parallel to a plane work surface, said bake pan structure being adapted to be rocked endwise upon said supports in spaced relationship to said work surface whereby the contents of the individual bake pans may be loosened and turned out of said pans intact and whole.

6. As a new article of manufacture a guide member formed from a single thickness of sheet metal and comprising an integral tongue and base member, said tongue being defined by a pair of upwardly converging sides, a pocket provided in said base member below and in vertical alignment with said tongue, said pocket comprising a pair of upwardly converging legs each spaced from and in substantial parallelism with one side of said tongue.

7. As a new article of manufacture a guide member formed from a single thickness of sheet metal and comprising an integral tongue and base member, said tongue being defined by a pair of upwardly converging inturned side walls, a pocket, said pocket provided centrally of said base member, below and in vertical alignment with said tongue member, said pocket being defined by a pair of inturned upwardly converging legs each spaced from and in substantial parallelism with one convergent side wall of said tongue, the end portion of said tongue being inclined inwardly of the plane of said base portion.

8. As a new article of manufacture a one piece guide member comprising a tongue and base member, said tongue comprising a truncated triangle, the edges of the convergent sides and horizontal top of said truncated triangle being turned inward of the body of said tongue for providing a continuous reinforced bearing surface, a pocket, said pocket in spaced relationship with said tongue and comprising a pair of upwardly converging legs, the outer edge of each leg being turned inward of the body of said base member for providing a substantial bearing surface at right angles to said base member, each leg being spaced from and in substantial parallelism with one side of said tongue, the upper portion of said tongue being inclined inward of the plane of said base portion for facilitating nesting of a plurality of such guide members one upon another.

9. As a new article of manufacture a guide member formed from a single thickness of sheet metal and comprising an integral tongue and base member, said tongue member defined by a pair of upwardly converging sides, said base portion having a pocket provided below and in spaced relationship with said tongue member, said pocket being defined by a pair of upwardly converging legs each being in substantial parallelism with a corresponding portion of the tongue from which it is spaced, the edges of converging sides of said tongue and edges of the converging legs of said pocket being turned inward of the guide member at right angles to the plane of the body of said guide member for for providing substantial reinforced bearing surfaces.

10. In a bake pan structure, the combination of a plurality of pans each having an open top, a pair of spaced and opposed connecting straps for securing the pans in unitary formation, spaced guide members fixed relative to the straps, and disposed at a distance from the opposite ends of the straps at an elevation above the open tops of the pans, whereby to provide fulcrums upon which the unitary pan structure may be rocked when inverted, to dislodge contents of the pans, said guide members including complementary tongues and pockets engageable with the tongues and pockets of other pan structures when stacked, to preclude relative shiftability of the stacked pan structures.

11. In a bake pan structure, the combination of a plurality of individual bake pans, a pair of spaced and opposed connecting straps for securing the individual pans in unitary formation, spaced guide members fixed relative to the straps, said guide members including complementary tongue and pocket portions, each tongue being defined by a pair of converging walls, each pocket being defined by a pair of legs which converge in spaced parallelism with a corresponding portion of the tongue from which it is spaced, said connecting straps forming a pocket wall intermediate said convergent pocket defining legs to guide complementary tongue portions of another pan structure into said pockets when the pan structures are nested one upon another.

ELMER H. CHANDONIA.